United States Patent [19]
Gaitonde et al.

[11] Patent Number: 5,940,779
[45] Date of Patent: Aug. 17, 1999

[54] ARCHITECTURAL POWER ESTIMATION METHOD AND APPARATUS

[75] Inventors: Dinesh D. Gaitonde, Chandler; Alberto J. Reyes, Phoenix; Hongyu Xie, Chandler, all of Ariz.; Dana M. Rigg, Austin, Tex.

[73] Assignee: Motorola Inc., Schaumburg, Ill.

[21] Appl. No.: 08/810,876

[22] Filed: Mar. 5, 1997

[51] Int. Cl.[6] .................................................. G06F 11/263
[52] U.S. Cl. .............................. 702/60; 702/57; 702/117; 364/490; 364/578; 395/183.13; 371/27.1; 371/27.4
[58] Field of Search .................................... 364/448–490, 364/578; 702/60, 61, 57, 65, 69, 79, 117, 124, 125, 189; 371/27.4, 27.1; 395/183.13, 183.08

[56] References Cited

U.S. PATENT DOCUMENTS

| | | | |
|---|---|---|---|
| 5,426,591 | 6/1995 | Ginetti et al. | 364/489 |
| 5,544,066 | 8/1996 | Rostoker et al. | 364/489 |
| 5,668,732 | 9/1997 | Khouja et al. | 702/60 |
| 5,673,420 | 9/1997 | Reyes et al. | 364/578 |

OTHER PUBLICATIONS

F. Najm, "Transition Density, A Stochastic Measure of Activity in Digital Circuits", 28th ACM/IEEE Design Automation Conference, Paper 38.1, Jul. 1991, pp. 644–649.

*Primary Examiner*—Hal Dodge Wachsman
*Attorney, Agent, or Firm*—Robert D. Atkins

[57] ABSTRACT

A method (100) and apparatus (600) estimates power of an architectural design. Power functions are generated (step 102) for standard components (20) by synthesizing to a power-measurable implementation (step 202). A behavioral description is simulated (step 106) to produce switching activity and then parsed (step 108) to compute power from power functions of instantiated standard components (steps 109, 114, 118) from switching activity (step 116). Behavioral operations are parsed (step 108) into short and long blocks based on the number of operations. Short blocks are precompiled (step 110) to produce an RTL implementation including standard components. Power is estimated from switching activity at ports and inferred nodes (step 420). Long blocks are synthesized to produce power-measurable implementations (step 112). Power is estimated with a power function from weighted switching activity at each input (steps 508, 512–514).

20 Claims, 5 Drawing Sheets

ARCHITECTURAL POWER ESTIMATION METHOD AND APPARATUS

BACKGROUND OF THE INVENTION

The present invention relates in general to integrated circuit design and, more particularly, to estimating power consumption of an architectural-level integrated circuit design.

Modern integrated circuits are being designed using high levels of design abstraction which are manually or automatically translated to lower levels of design detail. For example, a designer typically describes a circuit behaviorally using Hardware Description Language (HDL) or a similar behavioral modeling language. A series of design tasks are executed to convert the behavioral description to register transfer level (RTL), gate, transistor, layout, and mask level descriptions of the circuit. The behavioral description typically is the highest level of abstraction and has the least detail, while the mask description is typically the lowest level of abstraction and has the most detail. Higher levels of abstraction can be simulated more efficiently than lower levels, in part because less data is involved.

The behavioral description consists almost entirely of behavioral information with little or no structure. As the design is translated to successively lower levels of abstraction, the amount of structural information typically increases and the amount of behavioral information typically decreases. For example, a typical RTL description of a circuit includes circuit blocks which are defined to have a large degree of functionality but which also include such structural features as input and output ports or bus lines.

The power consumption of an integrated circuit largely depends on the structure of the circuit. Accuracy in predicting power consumption improves as the amount of structural information increases. The best accuracy is obtained when power consumption is estimated at a low abstraction level, such as the logic gate or transistor level. However, design efficiency improves when power can be estimated with reasonable accuracy at the behavioral level because designers are able to explore and analyze alternative designs more quickly at an early design stage.

Prior art methods delay power estimation until the design is transformed into a lower-level description, such as a gate-level or transistor-level description. However, a major redeployment of design and computing resources is needed if significant design modifications are made at a late design stage.

Hence, a need exists for an accurate, high-level power estimation system that allows a designer to explore and analyze alternative implementations of a design at an early stage in the design process.

DETAILED DESCRIPTION OF THE DRAWINGS

Figure 1:
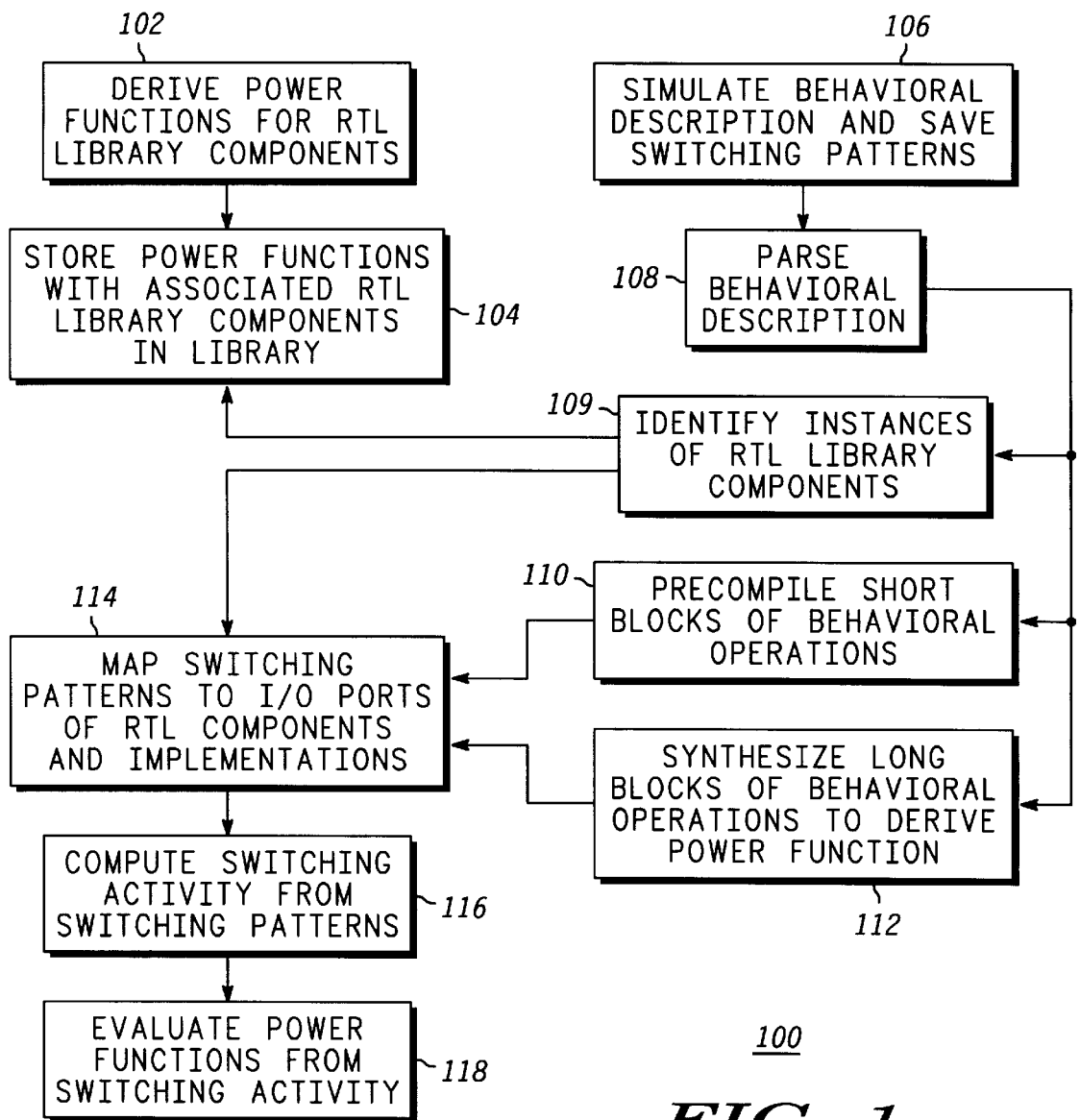
FIG. 1 is a flow diagram of an architectural power estimation method.

FIG. 1 is a flow diagram of an architectural power estimation method 100 used for estimating power consumption during the design phase of an integrated circuit. A typical architectural design begins with a behavioral description of the desired circuit operation which is generated by a designer and typically written in a text based programming language such as Verilog Hardware Description Language (Verilog HDL). The behavioral description includes instances of register transfer level (RTL) modules, which typically are standard components that include a description of one or more behavioral operations. The behavioral description also includes operations to be executed on predefined behavioral variables to produce the desired behavior of the circuit. The behavioral operations can be mapped to RTL components which implement the behavioral operations. The RTL components are interconnected so as to implement the behavioral description. Each variable which represents an operand of a behavioral function is mapped to an input of the corresponding RTL component. Each variable which represents a result calculated by the function is mapped to an output of the corresponding RTL component. During simulation of the behavioral description, switching patterns are computed for each variable and can be applied to the mapped terminals of the RTL components. A switching pattern is a series of binary values that represent logic states of a variable of the behavioral description or a node of an RTL implementation. Power consumption is evaluated from the switching patterns using a power function associated with each RTL component instantiated in the design.

Instantiated RTL components are typically represented as a schematic diagram of an integrated circuit. Data generated from such a schematic diagram is used to produce photomasks for fabricating physical structures of the integrated circuit on a semiconductor substrate to produce a physically-realized integrated circuit. The present power estimation method comprises a design portion of a manufacturing process for fabricating the integrated circuit which includes the instances of RTL components that implement the behavioral description.

At step 102, power functions are generated for standard RTL components to be stored in a library for later use (step 104). For each basic operation defined in the programming language, typically at least one RTL component that implements the basic operation is included in the library and matched to the basic operation. For example, a multiply operation in the behavioral language is matched to at least one RTL multiplier component which implements a multiply operation. Where more than one RTL library component is a multiplier, such a Booth multiplier and a Wallace tree multiplier, one of the multipliers is chosen by default to match the multiply operation. During a design, the designer can override a default component for a particular instance of an operation by instantiating, or designating, a different multiplier to implement that particular operation.

In addition, power functions are typically generated for RTL library components to implement combinations of operations, such as adders, multiplexers, memory blocks, etc. However, significant computing resources are needed to derive a power function, so that often power functions are generated only for RTL components that are used frequently.

Power functions are useful because they provide good estimates of power consumption for a given behavioral description without requiring the time-consuming transistor or logic gate-level simulation required with prior art methods. Power consumption can be computed analytically using a model based on technological parameters such as the configuration and number of logic gates, the operating voltage, and average node capacitances of the RTL component. Power functions treat these parameters as coefficients.

Switching transitions of logic components in an integrated circuit are treated as variables in the power function. In most integrated circuit technologies, the majority of power is consumed when nodes in the circuit are switching from one logic state to another. For example, complementary metal-oxide-semiconductor (CMOS) logic gates are configured to dissipate substantially zero power under static conditions because at least one switching transistor between the power supply and ground is off. However, during a switching transition, all of the switching transistors are momentarily turned on. Hence, power is consumed because current flows through the switching transistors and into or out of the node capacitance. The total power consumed depends in part on the number of nodes and the frequency of switching transitions.

Switching transitions are computed from switching patterns of variables of the behavioral description which are produced during behavioral simulation. Hence, a power function allows power consumption to be evaluated from data produced by a behavioral simulation without requiring a more time-consuming, structural simulation such as a transistor- or gate-level simulation. A simulation is a computer analysis tool to predict the behavior of a circuit from some higher level of abstraction. For example, a behavioral simulation is used to predict circuit operation from the behavioral description. A structural simulation is used to predict circuit operation from a level of abstraction that includes structural details of the circuit.

At step 106, the behavioral description is simulated using a standard behavioral or logic simulator with an input pattern provided by the designer. A switching pattern is computed for each variable of the behavioral description and stored in a simulation database (not shown).

At step 108, the behavioral description is parsed into one of three groups: instances of RTL library components, short blocks of behavioral operations and long blocks of behavioral operations. The groups require different treatment before power consumption can be computed.

Figure 2:
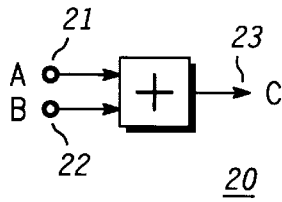
FIG. 2 is an RTL adder component.

Instances of RTL library components which are included in the behavioral description by the designer typically are identified by their implemented function (step 109). The RTL library components have associated power functions that are linked to the instantiated RTL component and used to compute power consumption. At step 114, the input and output ports of the instantiated RTL components are mapped to switching patterns of variables of the behavioral description. The RTL components and linked switching patterns are typically stored in a power estimation database (not shown) at step 114, As an example of the links between behavioral operations and RTL components, refer to the RTL adder component 20 shown in FIG. 2 and suitable for fabrication of an integrated circuit. RTL adder component 20 is functionally equivalent to the following short block of behavioral operations written in Verilog HDL: C=A+B. The block computes the sum of variables A and B and produces variable C as the result. RTL adder component 20 is an instance of an RTL library adder that has a precharacterized power function. At step 114, operands A and B along with their associated switching patterns are mapped to inputs 21 and 22 of RTL adder component 20 as shown. Result C and its switching pattern is mapped to output 23 of RTL adder component 20 as shown. RTL adder component 20 is stored in the power estimation database along with the switching patterns mapped to its ports. Power consumption can be estimated with the power function of the RTL library adder and the switching patterns at nodes 21–23.

Once the instantiated RTL components in the behavioral description have been processed at step 109, the remaining behavioral code is parsed into short and long blocks of behavioral operations. It should be noted that the short and long blocks include not only the behavioral operations but also the variables which function as either operands or results of the behavioral operations. Whether a particular block is parsed into a short or long block depends on the number of operations as will be described below.

At step 110, the blocks of behavioral operations designated as short blocks are identified. From time to time, a designer incorporates behavioral operations in the behavioral description for which there is no RTL library component that has been precharacterized with a power function. A short block of such behavioral operations is precompiled to form an RTL implementation that implements the functionality described in the short block's behavioral operations. Precompiling is a process by which a block of behavioral operations is separated into smaller portions such that each portion can be matched to an RTL library component. Instances of such matching RTL library components are interconnected to form the RTL implementation of the short block. Power consumption can be determined by evaluating the power functions of the individual RTL library components by applying switching activity computed during behavioral simulation to the ports of the RTL implementation. Switching activity includes those characteristics of a switching pattern that result in power being dissipated. For example, transitions of a node from one logic state to another logic state typically cause power to be dissipated in a circuit. Therefore, such transitions comprise switching activity of the node.

Precompiling is necessary because most blocks of behavioral operations have implicit rather than explicitly designated variables. The implicit variables result in inferred nodes being created in the RTL implementation. Inferred nodes are created after simulation and so are not known to the behavioral simulator.

An inferred node is an internal node of an RTL implementation that is typically located at an interconnection between adjacent RTL components, such as an output node of one RTL component and an input node of another RTL component. However, an inferred node is not a port of the RTL implementation, and therefore is not linked to a variable and does not have an associated switching pattern computed during simulation. Instead, switching activity of inferred nodes is estimated statistically or probabilistically. If a block of behavioral operations is too long, the RTL implementation can include chains of components in which inferred switching activity is estimated from other inferred switching activity. If the chains are too long, errors in the estimates can accumulate which reduce the accuracy of the power consumption estimate below acceptable levels. To prevent such cumulative errors from becoming excessive, precompiling is limited to relatively short blocks. For example, an acceptable overall error can often be achieved when a short block includes fewer than three behavioral operations.

Figure 3:
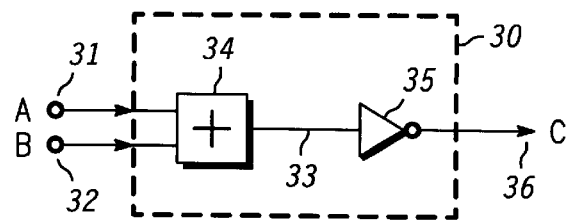
FIG. 3, is an RTL implementation that is functionally equivalent to behavioral operations.

An example of precompiling is shown in FIG. 3, which shows an RTL implementation 30 that is functionally equivalent to the behavioral operations described by the Verilog HDL statement C=!(A+B). The statement computes the sum (+) of variables A and B and inverts (!) the sum to produce variable C. Assume that the statement does not match any individual RTL library component so that pre-compiling is therefore necessary. The value A+B is an intermediate or implicit entity for which no switching pattern is computed by the simulator. During precompiling step 110, the "+" (PLUS) and "!" (NOT) operations are individually precompiled into an RTL adder component 34 and an RTL inverter component 35, respectively, both of which are assumed to be in the library and to have associated power functions.

Inputs 31 and 32 of RTL implementation 30 are coupled to inputs of RTL adder component 34. At step 114, the switching patterns of operands A and B are linked to inputs 31 and 32. Similarly, output 36 of RTL implementation 30 is coupled to an output 36 of RTL inverter component 35 and linked to the switching pattern of result C. Note that the implicit entity of the behavioral statement results in creating an inferred node 33 at the output of RTL adder component 34 and input of RTL inverter component 35. Hence, no switching pattern is computed for inferred node 33 during simulation. Power consumption cannot be computed from the power functions of RTL adder component 34 and RTL inverter component 35 until the switching activity at inferred node 33 is estimated.

Returning to FIG. 1, long blocks of behavioral operations (blocks having more than three operations) are synthesized to a power-measurable implementation using a standard synthesis tool (step 112). Synthesizing is a process of realizing an implementation of a behavioral function in which power is measurable. A power-measurable implementation is one which implements the function of the long block and has sufficient structure to allow power to be accurately measured either empirically with a physically realized implementation, or by simulating the implementation with an appropriate structural-level simulator. By way of example, the implementation can be synthesized at a transistor level in which current and voltage signals switched through transistors and other circuit components are measured to determine power.

A power function is derived for the power measurable implementation using a method similar to step 102, as is further described below. The derived power function is stored in the power estimation database along with the mapped switching patterns computed during simulation. At step 116, switching activity is derived from the switching patterns and the power function is evaluated to estimate power consumption.

Figure 4:
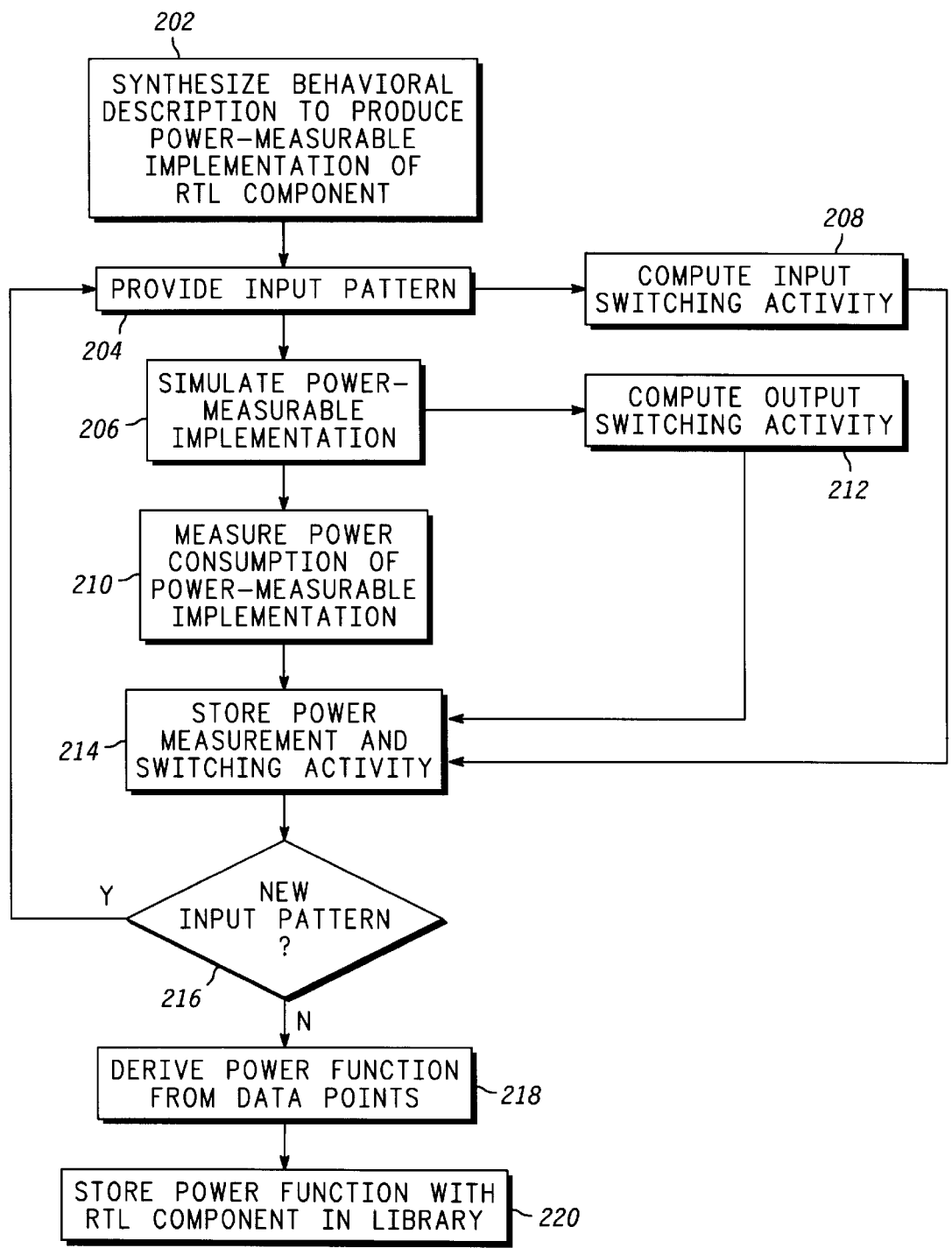
FIG. 4 is a flow diagram of a power function generation method.

FIG. 4 is a flow diagram of power function generation method 102 comprising steps 202–220. Power function generation method 102 generates an equation for estimating power consumption of an RTL component that implements a block of behavioral operations. The equation is evaluated to determine power consumption based on a switching pattern applied to the inputs of the RTL component.

Efficient simulation and accurate power estimation have contradictory requirements. Efficient simulation requires minimal structure, whereas power estimation preferably includes maximum structure. Method 102 resolves the contradictory requirements by efficiently estimating power consumption by simulating the behavioral description while introducing the least amount of structure needed to estimate power accurately.

In essence, method 102 estimates power consumption by forming a power function from power measurements of the behavioral description as an equation that is easily evaluated from switching transitions at the ports of an RTL component. The form of the equation is chosen to minimize computation while reasonably representing the relationship between empirical power measurements and switching activity. A polynomial equation derived by curve-fitting the power measurements satisfies these requirements and is often used for the power function. It has been determined that a good estimate of power consumption P for most RTL components can be obtained by forming a linear power function having the form $$(1) P = K_1 * T_{IN} + K_2 * T_{OUT} + C$$

where $T_{IN}$ is the number of switching transitions at all of the inputs and $T_{OUT}$ is the number of switching transitions at all of the outputs of the RTL component. $K_1$ and $K_2$ are empirically measured coefficients that represents the technology and the implemented logic function. The switching transitions are effectively counted from the simulated switching patterns. C is a constant term that represents direct current power dissipation when input and output switching activity is zero.

It should be noted that output transitions depend not only on the logic function of the RTL component but also on the particular logic vectors that comprise the input switching patterns. That is, even when two input patterns include the same logic vectors, the number of output transitions can vary depending on the order of the vectors in each pattern.

For example, consider a truth table for a standard two-input, one-bit AND function, shown in Table 1. Inputs IN1 and IN2 receive an input pattern comprising vectors 0–1–2–3 to produce a logic state for output OUT as shown.

TABLE 1

| VECTOR | IN1 | IN2 | OUT |
|---|---|---|---|
| 0 | 0 | 0 | 0 |
| 1 | 0 | 1 | 0 |
| 2 | 1 | 0 | 0 |
| 3 | 1 | 1 | 1 |
| Transitions | 1 | 3 | 1 = 5 |

As shown in Table 1, IN1 makes one switching transition (from vectors 1–2), IN2 makes three switching transitions (from vectors 0–1, 1–2, and 2–3), and OUT makes one switching transition (from vectors 2–3), for five total transitions. From equation 1, the power P consumed using the above input vectors is computed from $P = K_{IN} * (4) + K_{OUT} * (1) + C$.

When the input pattern applied to the AND function of Table 1 is varied, the transition count and power consumption can change, as shown in the truth table for the AND function of Table 2.

TABLE 2

| VECTOR | IN1 | IN2 | OUT |
|---|---|---|---|
| 2 | 0 | 1 | 0 |
| 3 | 1 | 1 | 1 |
| 0 | 0 | 0 | 0 |
| 1 | 1 | 0 | 0 |
| Transitions | 3 | 1 | 2 = 6 |

As shown in Table 2, when the input pattern is applied in 2–3–0–1 order, IN1 makes three logic transitions (from vectors 2–3, 3=0 and 0–1), IN2 makes one logic transition (from vectors 3–0), and OUT makes two logic transitions (from vectors 2–3 and 3–0), for six total transitions. The power consumption P is then given by $P=K_{IN}*(4)+K_{OUT}*(2)+C$. The increased number of transitions result in increased power consumption.

However, for some RTL components, the relationship between switching transitions and power is more complex because of functional dependencies among some of the inputs. In addition, special inputs such as clock or reset inputs can have a disproportionate impact on total power, so that a power function of the form shown in equation 1 is inadequate. In such cases, a more refined model can be derived. For example, switching transitions can be weighted at each port. Hence, the power function can have a form similar to (2) $P=K_{IN1}*T_1+K_{IN2}*T_2+\ldots K_{out}*T_{OUT}+C$ where $K_{IN1}$, $K_{IN2}$, ..., and $K_{OUT}$ represent weight coefficients and $T_1$, $T_2$, ..., $T_{OUT}$ represent switching transitions. C is a constant.

It is impractical to simulate a component with all possible combinations of input vectors. For an RTL component with n inputs, it can be shown that $2^n$ different input logic vectors can be applied to the RTL component. However, whether a logic transition occurs depends also on the previous input logic vector. It can be shown that the number of different vector pairs that can be applied to the RTL component is $2^n$, a number too large to exhaust all combinations of vector pairs even when n is a relatively small number.

At step 202, a behavioral function is synthesized using a standard synthesizing tool to produce a power-measurable RTL component that implements the function. Such a power-measurable RTL component typically includes a large amount of structural detail, so that simulating the RTL component with a structural simulator is time-consuming and therefore practical only for characterized RTL components that are frequently used.

A power-measurable implementation is one having sufficient structure that power can be accurately measured either empirically by operating a physically realized implementation, or by simulating the implementation with an appropriate structural-level simulator. By way of example, the implementation can be synthesized to a transistor level in which current and voltage signals switched through transistors and other circuit components are measured to determine power. Alternatively, the implementation can be synthesized with basic logic gates when the power consumption of the logic gates has been characterized.

At step 204, a random input switching pattern is generated with a standard random pattern generator. The input pattern includes a series of logic values whose length is preferably sufficient to exercise as many internal gates of the RTL component as possible to produce a representative power measurement. The length of the input pattern is based on the number of ports and the logic function of the RTL component. For most RTL library components, input patterns which provide random series of logic vectors and are between 1,000–10,000 cycles in length are adequate.

A transition parameter is used by the random pattern generator to control the likelihood of a switching transition of a vector in the input pattern. For example, if such a transition parameter has a value of 0.1, a random input pattern is generated in which the probability of a switching transition on a given cycle is 0.1. In that case, switching transitions would be expected to occur randomly on approximately ten percent of the cycles in the input pattern.

At step 206, the synthesized implementation is simulated with a structural simulator using the input switching pattern to produce an output switching pattern. The output switching pattern depends on the input switching pattern and on the logic function implemented by the RTL component.

At step 208, input switching activity is computed by counting the total number of transitions in the input pattern provided at step 204 and dividing by the cycle length of the input pattern. Hence, switching activity is typically expressed in units of transitions per cycle of the input pattern. In the example above, where the transition parameter is set to 0.1, the randomly generated input pattern typically produces a value of switching activity of 0.1 at each input.

At step 212, output switching activity is computed from the output switching pattern generated at simulation step 206. Output switching activity depends on the logic function of the RTL component and varies with the input pattern applied to the RTL component. Output switching activity is computed similarly to input switching activity by counting the total number of transitions in the output pattern and dividing by the cycle length of the input pattern Output switching activity is also typically expressed in units of transitions per cycle of the output pattern.

At step 214, the power measurement and switching activity are stored as an ordered pair that is used as a data point when the equation of the power function is derived. At step 216, a decision is made as to whether another data point should be generated. If so, method 102 loops back to step 204 to provide a new input pattern for simulating the RTL component (step 206). The switching activity of the new input pattern is typically varied to produce a new data point that includes a new value of total switching activity and a new power measurement.

Power function generation method 102 loops between steps 204–216 gathering data points until a power function can be generated with a desired accuracy by curve-fitting the data points using a standard least squares error minimization or similar technique. It should be noted that numerous variations or refinements of the curve fitting technique are possible, such as where it is desired to minimize error over a range where switching activity is high and the most power is consumed. For example, specific values of switching activity can be chosen for deriving a power function that is a polynomial that intersects the measured data points at the specified values of switching activity such that essentially zero error is generated when switching activity equals one of the specified values.

For most RTL components, an accurate power estimate can be obtained by providing input patterns having switching activity over a range of 0.1 to 0.9. For example, Table 3 shows a list of data points used to generate a power function of a typical RTL component. Included in Table 3 are total switching activity and measured power as a function of input switching activity over a typical range of simulations.

TABLE 3

| SIMULATION # | SWITCHING INPUT | ACTIVITY OUTPUT | MEASURED POWER |
|---|---|---|---|
| 1 | 0.1 | 0.04 | 61 microwatts |
| 2 | 0.15 | 0.01 | 62 microwatts |
| 3 | 0.2 | 0.03 | 63 microwatts |
| 4 | 0.25 | 0.04 | 64 microwatts |
| 5 | 0.3 | 0.02 | 65 microwatts |
| 6 | 0.35 | 0.02 | 66 microwatts |
| 7 | 0.4 | 0.04 | 66 microwatts |

TABLE 3-continued

| SIMULATION # | SWITCHING INPUT | ACTIVITY OUTPUT | MEASURED POWER |
|---|---|---|---|
| 8 | 0.45 | 0.04 | 67 microwatts |
| 9 | 0.5 | 0.02 | 67 microwatts |
| 10 | 0.55 | 0.03 | 68 microwatts |
| 11 | 0.6 | 0.03 | 69 microwatts |
| 12 | 0.65 | 0.02 | 70 microwatts |
| 13 | 0.7 | 0.03 | 71 microwatts |
| 14 | 0.75 | 0.04 | 73 microwatts |
| 15 | 0.8 | 0.03 | 73 microwatts |
| 16 | 0.85 | 0.04 | 74 microwatts |
| 17 | 0.9 | 0.02 | 75 microwatts |

The following power function derived from data points in Table 3 to produce zero error when input switching activity has the values 0.25 or 0.75: $P=(18*T_{IN}+75*T_{OUT}+56.5)$, where power P is expressed in microwatts.

For most RTL components, a power function obtained by curve-fitting the data points to a linear power function of the form shown in equation 5 provides a good estimate of power consumption. Standard statistical error analysis can be performed on the derived power function to ensure that the estimated values are within a prescribed error bound. When excessive errors are produced in the power estimates, the power function can be derived as a higher order polynomial or some other function that provides power estimates with smaller errors.

Figure 5:
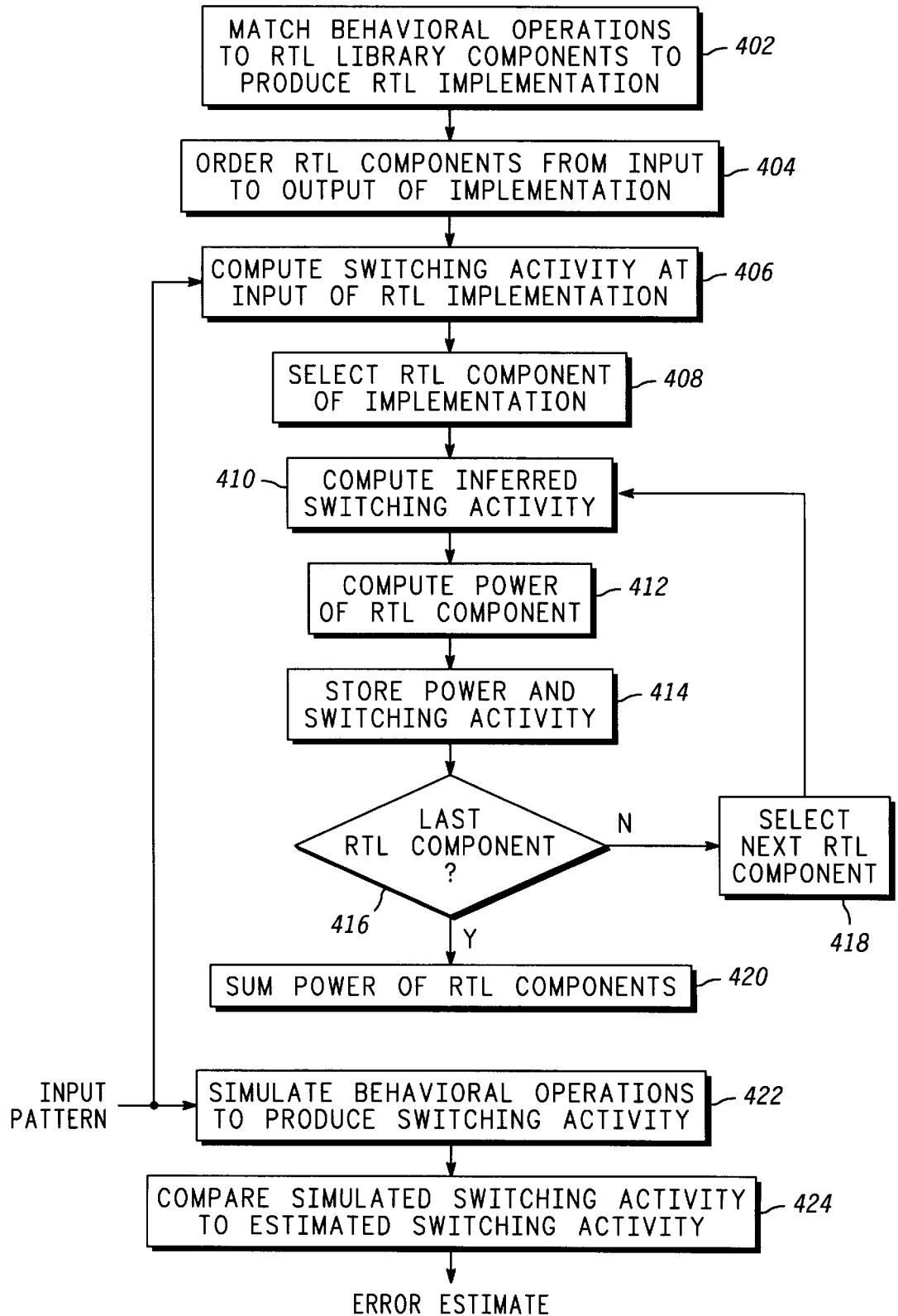
FIG. 5 is a flow diagram of a power opportunistic pre-compiling method.

FIG. 5 is a flow diagram of a power opportunistic pre-compiling method 110 used to generate an RTL implementation of a short block of behavioral operations in the behavioral description. In essence, precompiling method 110 identifies opportunities to replace the short blocks with functionally equivalent RTL implementations that are formed from RTL library components, i.e., that have associated power functions.

At step 402, the short blocks are divided into smaller portions that can be matched to functionally equivalent RTL library components. Text patterns of the portions are compared to entries in a reference list or lookup table of RTL library components. An entry includes behavioral code associated with an RTL component which describes one or more behavioral operations implemented by the RTL library component.

The RTL library components are instantiated such that operands and results of each smaller portion of the short block are respectively mapped to inputs and outputs of the matching RTL component. Switching patterns of variables of the short block are computed during simulation and mapped to the corresponding ports of the RTL implementation. The RTL components are interconnected so that the RTL implementation executes the function described by the short block.

At step 404, a standard sorting program is used to produce an ordered list in which RTL components are sorted in the order in which signals flow through the RTL implementation More particularly, whenever an output of a first RTL component drives an input of a second RTL component, the first RTL component appears prior to the second RTL component in the ordered list.

At step 406, switching activity at each port of the RTL implementation is computed from switching patterns generated during the behavioral simulation for variables in the short block.

For inferred nodes that are unknown and unrecognized by the behavioral simulator, an estimate of inferred switching activity is needed because the simulation does not generate a corresponding switching pattern. Recall that power functions are evaluated from switching activity at both the inputs and outputs of RTL components. Because a switching pattern is not produced for an inferred node, switching activity is estimated or inferred. To estimate inferred switching activity, a statistical model is used to represent logic transitions of an inferred node.

A transition density model is one such statistical model that estimates output switching activity from the input switching and logic function of an RTL component. The transition density model is described in detail in F. Najm, "Transition Density, A Stochastic Measure of Signal Activity in Digital Circuits," 28th Design Automation Conference, pages 644–649, ACM/IEEE, June, 1991. The signal probability and transition density of a switching pattern are computed to derive a statistical figure of merit designated as the switching activity of the switching pattern. The signal probability is the probability on any cycle that the switching pattern has a logic state of one. The transition density is the number of transitions per cycle of the switching pattern. For a given logic function of an RTL component, an accurate estimate of output switching activity can be statistically derived from the input switching activities. For example, it can be shown that the transition density $T_{OUT}$ for the output of a logical AND function having inputs A and B is given by $$(3) \quad T_{OUT}=T_A*P_B+T_B*P_A$$

where $T_A$ and $T_B$ are the transitions densities of inputs A and B, respectively, and $P_B$ and $P_A$ are the static probabilities of inputs B and A, respectively. In particular, if $P_A=P_B=0.5$ and $T_A=T_B=0.25$, the $T_{OUT}=(0.25)*(0.5)+(0.25)*(0.5)=0.25$. In other words, an output transition is expected on 25% of the cycles. Power consumption is calculated as a function of the input and output switching activities, including the estimated switching activity of inferred nodes.

At step 408, the first RTL component in the ordered list is selected. At step 410, inferred switching activity at any inferred nodes of the first RTL component is estimated using a statistical model such as the transition density model.

At step 412, power consumption is evaluated for the first RTL component with the associated power function using the input and output switching activity, some or all of which can be inferred switching activity. At step 414, power consumption and inferred switching activity are stored in a power estimation database.

If RTL components in the RTL implementation remain for which power consumption has not been estimated, the next RTL component in the ordered list is selected (steps 416, 418) and inferred switching activity is estimated at step 410. Precompiling method 110 thereby loops through steps 410–418 until power consumption has been computed for all of the RTL components in the RTL implementation. Step 420 is a step of computing power consumption of the RTL implementation by summing the power consumption of the individual RTL components from the input and inferred switching activity.

An error estimate of computed power consumption due to errors in the switching activity at inferred nodes can be obtained by executing steps 422 and 424 as follows. For RTL components having one or more inferred inputs and one or more outputs that are also outputs of the RTL implementation, switching activity at the outputs is estimated as if the outputs were inferred nodes (step 422). The estimated output switching activity is compared at step 424 to the output switching activity generated by the behavioral simulator. The difference between the estimated and simulated switching activities represents cumulative error in estimating inferred switching activity and power consumption of the RTL component.

Figure 6:
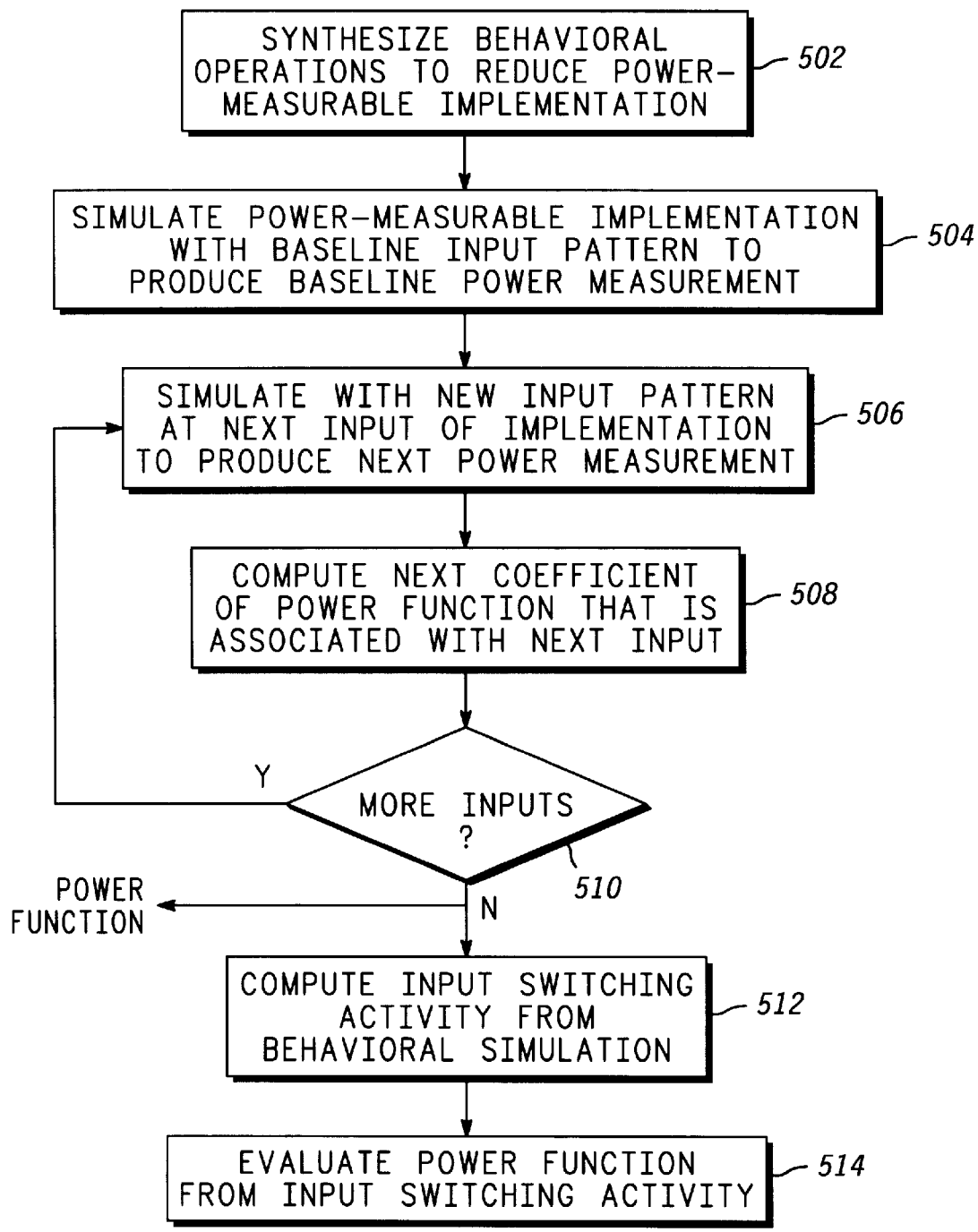
FIG. 6 is a flow diagram of another power estimation method.

FIG. 6 is a flow diagram of power estimation method 112 used to characterize long blocks of behavioral operations for which no individual RTL library component implements the function described in the long block. Method 112 generates a power function for RTL implementations of long blocks "on-the-fly" while power consumption of the behavioral description is being estimated with method 100. Power estimation method 112 requires more computing resources than precompiling method 110 because a power function is generated at the same time power is being estimated Therefore, method 112 is used only where precompiling method 110 would produce an estimate with an excessive error, i.e., for blocks having more than about three behavioral operations. In a typical design, method 112 is needed on only about ten percent of the RTL components in a design, which allows a power estimate to be obtained while having a minimal impact on overall computing time.

Method 112 is more efficient than power function generation method 102 because the resulting power function is evaluated only from switching activity at the inputs of the RTL implementation but not from output switching activity. By omitting output switching activity, a power function can be derived rapidly and with little sacrifice in accuracy as compared with the more exhaustive power function generation method 102. Good accuracy is achieved by recognizing the different portions of output switching activity that are attributable to switching activity at different inputs. In essence, weighting parameters are derived for each input of the RTL implementation to account for each input's contribution to total power.

It has been found that an accurate estimate of power consumption P for an RTL implementation with N inputs (1 through N) can be obtained from a power function having the form (4) $P = A_1 T_1 + A_2 T_2 + \ldots + A_N T_N$ where $A_1, A_2, \ldots A_N$ are weighting parameters that represent the amount of power consumed when a transition occurs on inputs 1 through N, respectively $A_1, A_2, \ldots A_N$ are expressed in units of power/transition/cycle. $T_1, T_2, \ldots T_N$ represent switching activity at inputs 1 through N, respectively, and are expressed in units of transitions/cycle.

At step 502, a standard synthesizing program is used to synthesize the long block of behavioral operations into a power-measurable RTL implementation using a procedure similar to that of step 202 of method 102. The power-measurable RTL implementation is simulated with a structural simulator using a reference input pattern with a known value of switching activity (step 504) to produce a baseline power measurement $P_B$. The reference input pattern typically is selected to produce switching activity of 0.5 at each input, i.e., $T_1 = T_2 = \ldots = T_N = 0.5$. Baseline power $P_B$ is therefore given by (5) $P_B = A_1(0.5) + A_2(0.5) + \ldots + A_N(0.5)$ Steps 506–510 are used for evaluating the portion of power attributable to switching activity at each input in order to determine the values of the weighting parameters $A_1$ through $A_N$. The difference ($P - P_B$) between estimated power consumption P and baseline power consumption $P_B$ is given by (6) $P - P_B = A_1*(T - 0.5) + A_2*(T_2 - 0.5) + \ldots + A_N*(T_N - 0.5)$ At step 506, the RTL implementation is simulated with a second input pattern which changes the switching activity at a first input of the RTL implementation but maintains switching activity at the other inputs constant. A power measurement $P_1$ is taken. For example, the second input pattern can produce $T_1 = 0.9$ transitions/cycle at the first input while producing $T_2 = T_3 = \ldots = T_N = 0.5$ transitions per cycle at the other inputs. The difference between $P_1$ and $P_B$ is (7) $P_1 - P_B = A_1*(0.9 - 0.5) + A_2*(0.5 - 0.5) + \ldots + A_N*(0.5 - 0.5)$
$= A_1*(0.4)$ At step 508, weighting parameter $A_1$ for the first input is derived from equation 7 as follows:

(80) $A_1 = (P_1 - P_B)/(0.9 - 0.5) = (P_1 - P_B)/0.4$

Because both $P_1$ and $P_B$ are power measurements, both $P_1$ and $P_B$ are known quantities. Therefore, $A_1$ is also a known quantity. For example, if the baseline power measurement $P_B$ is 10.0 milliwatts and power measurement $P_1$ is 14.0 milliwatts, then $A_1 = (14.0 - 10.0)/0.4 = 10.0$ milliwatts/transition/cycle.

At step 510, method 112 branches to step 506 to compute the weighting parameters for the other inputs in a similar fashion. For example, if the RTL implementation has a second input, method 112 loops back to step 506 to perform a third simulation with a third input pattern. The third input pattern applies $T_2 = 0.9$ transitions/cycle of switching activity to the second input. Switching activity at the other inputs, including the first input, is held constant at 0.5 transitions/cycle. A third power measurement is obtained and weighting parameter $A_2$ is derived at step 508 in a similar fashion to the derivation of $A_1$. A similar loop is made through steps 506–510 for the other inputs.

After the weighting parameters have been derived for all of the inputs (step 510), the resulting power function is linked to the RTL implementation and stored in the power estimation database. The RTL implementation and power function can also be included in the library for later use.

At step 512, the input switching patterns produced during behavioral simulation are mapped to the respective inputs of the RTL implementation. Switching activity is computed for each input from the switching patterns. At step 514, the power function is evaluated from the switching activity and the weighting patterns in accordance with equation 4 above to produce estimated power consumption of the RTL component.

Figure 7:
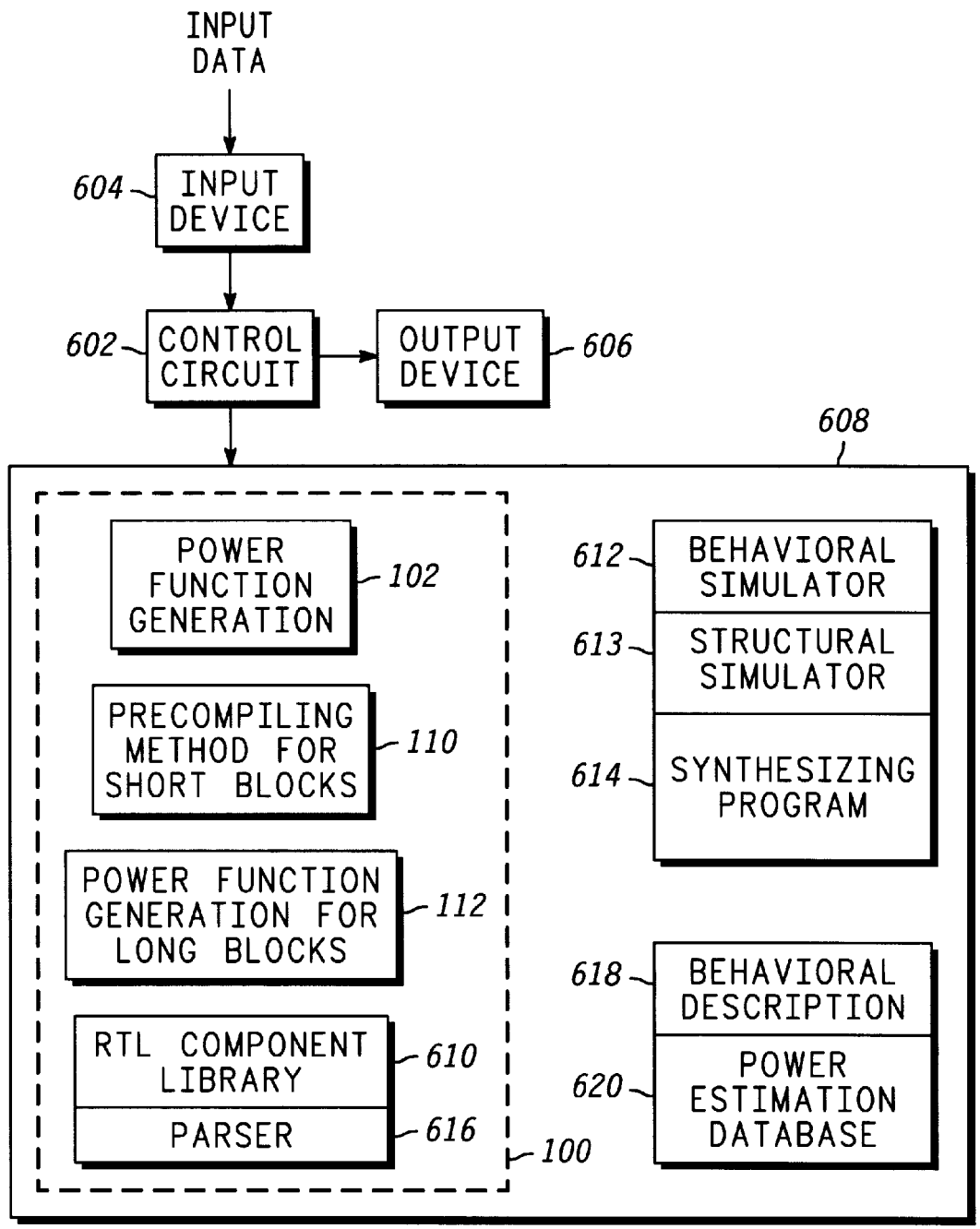
FIG. 7 is a block diagram of a computer.

FIG. 7 shows a block diagram of a computer 600 used to design an integrated circuit with power estimation method 100, including a control circuit 602, an input device 604, an output device 606 and a memory 608. Input device 604 provides a means for entering input data into computer 600. Where data is entered interactively by a designer, input device 604 typically includes a keyboard. However, input device 604 can also comprise other types of input devices such as disks or tape drives, modems or scanning devices. Input data is coupled from input device 604 to control circuit 602, which executes architectural power estimation method 100 stored in memory 608 that determines how the input data is processed. Included in method 100 are power function generation method 102, precompiling method 110, long block power function generation program 112, and RTL component library 610.

Output device 606 typically includes a display monitor for interactively displaying data received from control circuit 602 which is representative of the integrated circuit architectural system being designed. Output device 606 can include other types of devices which display or transfer data which is generated or stored in computer 600, such as printers, modems and disk or tape drives.

Control circuit 602 executes software programs stored in memory 608 for implementing architectural power estimation method 100. Control circuit 602 typically comprises a microprocessor, but the functions of control circuit 602 can be provided by other types of logic circuits including state machines. Control circuit 602 also executes behavioral and structural simulators 612 and 613, as well as synthesizing program 614 and parser 616 stored in memory 608.

Control circuit 602 manages the flow of data internal to computer 600 as well as input data received from input device 604 and display data transferred to output device 606. Control circuit 602 retrieves, modifies and stores data saved in RTL component library 610, power estimation database 620 and behavioral description 618 of memory 608, under the direction of an executable program.

Memory 608 includes the above described plurality of memory regions for storing data and software programs used to implement architectural power estimation method 100. Memory 608 can include random-access memory, read-only memory, magnetic storage media such as floppy disks, hard disks and magnetic tape, optical storage media such as compact disks, and similar memory devices.

By now it should be appreciated that a method and apparatus have been provided for estimating power consumption of an architectural integrated circuit design at a behavioral architectural level. A power function is generated for often-used RTL library components by synthesizing the components to a structural level such that power can be measured. The power function is used during behavioral simulation to compute power based on switching activity at the terminals of the RTL library component which is generated during simulation. Instances of RTL library components are identified in the behavioral description and power is estimated using the power function of the associated RTL library component.

The remaining behavioral code that cannot be matched to an RTL library component is divided into short and long blocks based on the number of behavioral operations in a block. The short blocks are precompiled to produce functionally equivalent RTL implementations comprised of RTL library components. Inferred switching activity of the RTL implementation is statistically estimated from switching activity at the inputs of the RTL implementation. Power is estimated by evaluating the power functions of the RTL library components from the input and output switching activity of the RTL components, including inferred switching activity.

Long blocks of behavioral operations are synthesized to produce power-measurable implementations that are functionally equivalent to the long blocks. A power function is generated "on-the-fly" during power analysis using a novel method in which the portion of total power attributable to switching activity at each input is determined. A weighting parameter is derived for each input to reflect differences in power consumption due to switching activity at different inputs. Power is estimated with the power function from the input switching activity.

What is claimed is:

1. A method for estimating power consumption of a behavioral description of an integrated circuit, comprising the steps of:
   matching a plurality of operations of the behavioral description with a plurality of RTL library components to produce a register transfer level (RTL) implementation of the plurality of operations with the plurality of RTL library components;
   applying input switching activity of the plurality of operations to an input of the RTL implementation to produce inferred switching activity at an internal node of the RTL implementation between adjacent ones of the plurality of RTL library components; and
   computing power consumption of the RTL implementation as a function of the input switching activity and the inferred switching activity.

2. The method of claim 1, wherein the step of applying input switching activity includes a step of applying switching activity of an operand of a first operation of the plurality of operations to the input of the RTL implementation to produce a result of the plurality of operations at an output of the RTL implementation.

3. The method of claim 2, further comprising a step of characterizing the plurality of RTL library components to produce a plurality of power functions of the plurality of RTL library components.

4. A The method of claim 3, wherein a first RTL library component of the plurality of RTL library components has an input for receiving the input switching activity and an output for producing the inferred switching activity, and the step of computing power consumption includes a step of evaluating a power function of the first RTL library component from the input switching activity and the inferred switching activity.

5. The method of claim 4, wherein a second RTL library component of the plurality of RTL library components has an input for receiving the inferred switching activity and an output for producing output switching activity of the RTL implementation, and the step of computing power consumption further includes a step of evaluating a power function of the second RTL library component from the inferred switching activity and the output switching activity of the RTL implementation.

6. The method of claim 5, further comprising the steps of:
   simulating the behavioral description with the input switching activity to produce switching activity of the result of the plurality of operations; and
   comparing the output switching activity of the RTL implementation to the switching activity of the result of the plurality of operations to produce an error estimate of the power consumption.

7. A method for estimating power consumption of a behavioral description of an integrated circuit, comprising the steps of:
   synthesizing the behavioral description to produce an implementation of the behavioral description where power consumption of the implementation is measurable;
   simulating the implementation with a first input pattern to produce a first power measurement;
   forming a power function of the behavioral description from the first power measurement, wherein the step of forming the power function includes the steps of,
      (a) applying a second input pattern to a first input of the implementation,
      (b) simulating the implementation with the second input pattern to produce a second power measurement, and
      (c) computing from the first and second power measurements a first parameter of the power function indicative of a first portion of the power consumption produced by switching the first input; and
   computing power consumption of the behavioral description with the power function.

8. The method of claim 7, wherein the step of computing the power consumption further includes the steps of:

applying a third input pattern to the first input of the implementation to produce switching activity at the first input; and computing the power consumption of the behavioral description from the first parameter and the switching activity at the first input.

9. The method of claim 8, wherein the step of computing the power consumption of the behavioral description from the first parameter includes a step of multiplying the first parameter by the switching activity.

10. The method of claim 9, wherein the step of forming the power function further includes the steps of:

applying a third input pattern to a second input of the implementation;

simulating the implementation with the third input pattern to produce a third power measurement of the implementation; and computing with the first and third power measurements a second parameter of the power function indicative of a second portion of the power consumption produced by switching the second input.

11. The method of claim 10, further comprising the steps of:

simulating the behavioral description with a fourth input pattern to produce switching activity of the first input of the implementation and switching activity of the second input of the implementation; and evaluating the power function from the first and second parameters and the switching activities of the first and second inputs of the implementation to estimate the power consumption of the behavioral description.

12. The method of claim 11, wherein the step of evaluating the power function includes the steps of:

multiplying the first parameter by the switching activity of the first input; and multiplying the second parameter by the switching activity of the second input.

13. A method for estimating power consumption of a behavioral description of an integrated circuit, comprising the steps of:

simulating the behavioral description to produce switching activity of a first block of behavioral operations;

synthesizing the first block of behavioral operations to produce a power-measurable implementation of the first block of behavioral operations;

simulating the power-measurable implementation with a first input pattern to produce a first power measurement;

forming a power function of the first block of behavioral operations from the first power measurement; and evaluating the power function from the switching activity to compute the power consumption of the behavioral description.

14. The method of claim 13, further comprising the steps of:

simulating the power-measurable implementation with a plurality of input patterns to produce a plurality of power measurements; and forming the power function from the plurality of power measurements.

15. The method of claim 14, wherein the step of simulating the behavioral description produces input switching activity of a second block of behavioral operations, further comprising the steps of:

matching the second block of behavioral operations of the behavioral description with a plurality of RTL library components to produce a register transfer level (RTL) implementation of the second block of behavioral operations with the plurality of RTL library components;

applying the input switching activity to an input of the RTL implementation to produce inferred switching activity at an internal node of the RTL implementation between adjacent first and second RTL library components of the plurality of RTL library components; and computing power consumption of the RTL implementation as a function of the input switching activity and the inferred switching activity.

16. The method of claim 15, wherein the step of applying the input switching activity includes a step of applying the input switching activity to produce a result of the second block of behavioral operations at an output of the RTL implementation.

17. The method of claim 16, wherein the step of applying the input switching activity includes a step of applying switching activity of an operand of the second block of behavioral operations to an input of the first RTL library component to produce the inferred switching activity at an output of the first RTL library component.

18. The method of claim 17, wherein the step of computing power consumption includes a step of evaluating a power function of the first RTL library component from the input switching activity and the inferred switching activity.

19. An integrated circuit manufactured using a method comprising the steps of:

simulating a behavioral description to produce switching activity of a first block of behavioral operations;

synthesizing the first block of behavioral operations to produce a power-measurable implementation of the first block of behavioral operations;

simulating the power-measurable implementation with a first input pattern to produce a first power measurement;

forming a power function of the first block of behavioral operations from the first power measurement; and evaluating the power function from the switching activity to compute power consumption of the behavioral description.

20. A computing apparatus for estimating power consumption of an architectural integrated circuit design, comprising:

means for simulating a behavioral description to produce switching activity of a first block of behavioral operations;

means for synthesizing the first block of behavioral operations to produce a power-measurable implementation of the first block of behavioral operations;

means for simulating the power-measurable implementation with a first input pattern to produce a first power measurement;

means for forming a power function of the first block of behavioral operations from the first power measurement; and means for evaluating the power function from the switching activity to compute the power consumption of the behavioral description.

* * * * *